US012617180B2

(12) United States Patent
Polen et al.

(10) Patent No.: US 12,617,180 B2
(45) Date of Patent: May 5, 2026

(54) COATED REINFORCED COMPOSITE FACER AND INSULATION ASSEMBLY INCLUDING THE SAME

(71) Applicant: Owens Corning Intellectual Capital, LLC, Toledo, OH (US)

(72) Inventors: Shane Polen, Columbus, OH (US);
Jianhui Wu, Westerville, OH (US);
Mitchell Steindler, Wooster, OH (US);
Kevin Click, Columbus, OH (US);
Tyler Musick, Heath, OH (US); Eric Ramey, Thornville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 159 days.

(21) Appl. No.: 18/294,720

(22) PCT Filed: Aug. 3, 2022

(86) PCT No.: PCT/US2022/039251
§ 371 (c)(1),
(2) Date: Feb. 2, 2024

(87) PCT Pub. No.: WO2023/014771
PCT Pub. Date: Feb. 9, 2023

(65) Prior Publication Data
US 2024/0336029 A1    Oct. 10, 2024

Related U.S. Application Data

(60) Provisional application No. 63/230,298, filed on Aug. 6, 2021.

(51) Int. Cl.
*B32B 5/26* (2006.01)
*B32B 5/24* (2006.01)
(Continued)

(52) U.S. Cl.
CPC .............. *B32B 5/262* (2021.05); *B32B 5/245* (2013.01); *B32B 7/12* (2013.01);
(Continued)

(58) Field of Classification Search
None
See application file for complete search history.

(56) References Cited

U.S. PATENT DOCUMENTS 4,283,457 A    8/1981    Kolsky et al.
4,504,533 A    3/1985    Altenhoefer et al.
(Continued)

FOREIGN PATENT DOCUMENTS

CA    1309828 C    11/1992
CA    1309831 C    11/1992
(Continued)

OTHER PUBLICATIONS

International Search Report and Written Opinion from PCT/US2022/039252 dated Oct. 17, 2022.
(Continued)

*Primary Examiner* — Chinessa T. Golden
(74) *Attorney, Agent, or Firm* — Calfee, Halter & Griswold LLP

(57) ABSTRACT

A coated reinforced composite facer. an insulation assembly, and a method of making a coated reinforced composite facer are provided. The coated reinforced composite facer includes a carrier substrate, a scrim, a thermoplastic coating, and a mineral coating. The thermoplastic coating adheres the scrim to one surface of the carrier substrate and the mineral coating is adhered to an opposite surface of the carrier substrate. An insulation assembly including a coated reinforced composite facer has a pull-through strength that
(Continued)

allows the insulation assembly to be installed using fewer fasteners, while also rendering the insulation assembly relatively impermeable.

20 Claims, 3 Drawing Sheets

(51) Int. Cl.
*B32B 7/12* (2006.01)
*B32B 37/12* (2006.01)

(52) U.S. Cl.
CPC ... *B32B 2037/1215* (2013.01); *B32B 2250/03* (2013.01); *B32B 2255/02* (2013.01); *B32B 2255/20* (2013.01); *B32B 2262/02* (2013.01); *B32B 2262/101* (2013.01); *B32B 2266/0278* (2013.01); *B32B 2307/304* (2013.01); *B32B 2307/718* (2013.01); *B32B 2307/7376* (2023.05); *B32B 2419/06* (2013.01)

(56) References Cited

U.S. PATENT DOCUMENTS

| | | | |
|---|---|---|---|
| 4,647,496 A | 3/1987 | Lehnert et al. |
| 4,810,569 A | 3/1989 | Lehnert et al. |
| 4,948,647 A | 8/1990 | Burkard |
| 5,148,645 A | 9/1992 | Lehnert et al. |
| 5,220,762 A | 6/1993 | Lehnert et al. |
| 5,319,900 A | 6/1994 | Lehnert et al. |
| 5,371,989 A | 12/1994 | Lehnert et al. |
| 5,644,880 A | 7/1997 | Lehnert et al. |
| 5,698,302 A | 12/1997 | Brandon et al. |
| 5,698,304 A | 12/1997 | Brandon et al. |
| 5,704,179 A | 1/1998 | Lehnert et al. |
| 5,791,109 A | 8/1998 | Lehnert et al. |
| 6,054,205 A | 4/2000 | Newman et al. |
| 6,391,131 B1 | 5/2002 | Newman et al. |
| 6,838,163 B2 | 1/2005 | Smith et al. |
| 7,049,251 B2 | 5/2006 | Porter |
| 7,138,346 B2 | 11/2006 | Bush et al. |
| 7,300,515 B2 | 11/2007 | Porter |
| 7,300,892 B2 | 11/2007 | Porter |
| 7,645,490 B2 | 1/2010 | Bush et al. |
| 7,749,598 B2 | 7/2010 | Agrawal |
| 7,785,703 B2 | 8/2010 | Agrawal |
| 7,803,723 B2 | 9/2010 | Herbert et al. |
| 7,846,278 B2 | 12/2010 | Porter |
| 7,867,927 B2 | 1/2011 | Bush et al. |
| 7,972,688 B2 | 7/2011 | Letts et al. |
| 7,984,591 B2 | 7/2011 | Cashin et al. |
| 8,426,017 B2 | 4/2013 | Paradis et al. |
| 8,546,278 B2 | 10/2013 | Paradis et al. |
| 8,852,368 B2 | 10/2014 | Herbert et al. |
| 9,017,495 B2 | 4/2015 | Porter |
| 9,605,433 B2 | 3/2017 | Paradis et al. |
| 9,758,909 B2 | 9/2017 | Paradis et al. |
| 9,944,063 B1 * | 4/2018 | Lakrout ................. B32B 37/02 |
| 10,000,922 B1 | 6/2018 | Letts |
| 10,208,413 B2 | 2/2019 | Paradis et al. |
| 10,450,741 B2 | 10/2019 | Letts |
| 10,450,752 B2 | 10/2019 | Paradis et al. |
| 10,569,508 B2 | 2/2020 | Nandi et al. |
| 10,737,460 B2 | 8/2020 | Teng et al. |
| 10,801,205 B2 | 10/2020 | Leatherman et al. |
| 10,953,626 B2 | 3/2021 | Kirkwood et al. |
| 11,242,681 B2 | 2/2022 | Letts et al. |
| 2002/0182953 A1 | 12/2002 | Porter |
| 2002/0182954 A1 | 12/2002 | Porter |
| 2004/0033749 A1 | 2/2004 | Smith et al. |
| 2010/0087114 A1 | 4/2010 | Bush et al. |
| 2011/0033684 A1 | 2/2011 | Agrawal |
| 2011/0214373 A1 | 9/2011 | Brandt et al. |
| 2011/0214387 A1 | 9/2011 | Brandt et al. |
| 2011/0269363 A1 | 11/2011 | Cashin et al. |
| 2012/0167509 A1 | 7/2012 | Brandt et al. |
| 2012/0167510 A1 | 7/2012 | Brandt et al. |
| 2013/0036694 A1 | 2/2013 | Brandt et al. |
| 2013/0337709 A1 | 12/2013 | Paradis et al. |
| 2014/0242862 A1 | 8/2014 | Porter |
| 2015/0240492 A1 | 8/2015 | Teng et al. |
| 2016/0069070 A1 | 3/2016 | Li |
| 2016/0236455 A1 | 8/2016 | Fay et al. |
| 2016/0361892 A1 | 12/2016 | Ciuperca |
| 2016/0361894 A1 | 12/2016 | Ciuperca |
| 2016/0369510 A1 | 12/2016 | Brandt et al. |
| 2018/0087277 A1 | 3/2018 | Brandt et al. |
| 2018/0320370 A1 | 11/2018 | Letts et al. |
| 2019/0194947 A1 | 6/2019 | Brandt et al. |
| 2020/0011050 A1 | 1/2020 | Letts |
| 2020/0147931 A1 | 5/2020 | Nandi et al. |
| 2020/0299968 A1 | 9/2020 | Brandt et al. |
| 2020/0384735 A1 | 12/2020 | Gilley et al. |
| 2020/0385992 A1 | 12/2020 | Gilley et al. |
| 2020/0399901 A1 | 12/2020 | Leatherman et al. |
| 2021/0108408 A1 | 4/2021 | Letts et al. |

FOREIGN PATENT DOCUMENTS

| | | | |
|---|---|---|---|
| CA | 1326625 C | 2/1994 | |
| WO | WO-2021142337 A1 * | 7/2021 | ............ B32B 5/245 |

OTHER PUBLICATIONS

International Search Report and Written Opinion from PCT/US2022/039251 dated Nov. 9, 2022.

* cited by examiner

COATED REINFORCED COMPOSITE FACER AND INSULATION ASSEMBLY INCLUDING THE SAME

CROSS REFERENCE TO RELATED APPLICATIONS

This application is the U.S. national stage entry of PCT/US2022/039251, filed on Aug. 3, 2022, which claims priority to and all benefit of U.S. Provisional Patent Application No. 63/230,298, filed on Aug. 6, 2021, the entire disclosures of which are fully incorporated herein by reference.

FIELD

The general inventive concepts relate to facer materials and, more particularly, to a coated reinforced composite facer that includes a carrier substrate, a scrim, a thermoplastic coating, and a mineral coating. The coated reinforced composite facer is useful as a facer for insulation substrates, particularly insulation substrates that are used in roofing systems.

BACKGROUND

A commercial roof tends to have a low slope or be entirely flat and is much larger than a typical residential roof. Roofing systems for commercial roofs typically include many insulation panels having a core formed of polyisocyanurate or other insulative materials that are secured to the roof deck. Protective cover boards are placed on top of the insulation panels. The cover boards may also have a core formed of polyisocyanurate or other insulative materials. The cores of the insulation panels and cover boards are generally sandwiched between facer materials. A conventional facer material for insulation panels and cover boards, particularly an upper surface thereof, is a coated glass facer, which is formed by applying a mineral-based coating onto a nonwoven glass mat. The cover boards are secured to the underlying insulation panels and the roof deck using a number of fasteners, such as sixteen (16) fasteners per coverboard.

In addition to containing the core materials, the facer materials serve a variety of functions. For example, facer materials can add structural integrity and dimensional stability to the insulation panels and coverboards. Also, facer materials can provide improved performance with respect to wind uplift as well as indentation resistance. Wind uplift can cause fastener pull-through and failure of the roofing system. In typical roofing systems, improved wind uplift performance is accomplished by using additional fasteners to secure the cover boards and insulation panels to the roof deck. However, using more fasteners increases the amount of labor and materials required to install the roofing system, which also increases the total amount of time and cost associated with installing the roofing system.

Accordingly, there is a need in the art for facer materials for insulation panels and coverboards that provide acceptable performance in a roofing system while requiring fewer fasteners.

SUMMARY

The general inventive concepts relate to a coated reinforced composite facer, an insulation assembly that includes a coated reinforced composite facer, and a method of making a coated reinforced composite facer. To illustrate various aspects of the general inventive concepts, several exemplary embodiments of coated reinforced composite facers, insulation assemblies, and methods of making the coated reinforced composite facer are disclosed.

In accordance with one aspect of the present disclosure, a coated reinforced composite facer is provided. The coated reinforced composite facer includes a carrier substrate having a first carrier surface and a second carrier surface, a scrim, a thermoplastic coating, and a mineral coating. The thermoplastic coating is positioned between the scrim and the first carrier surface and adheres the scrim to the first carrier surface. The mineral coating is adhered to the second carrier surface.

In accordance with one aspect of the present disclosure, an insulation assembly is provided. The insulation assembly includes an insulation substrate and a coated reinforced composite facer. The insulation substrate has a first insulation surface and a second insulation surface. The coated reinforced composite facer includes a carrier substrate having a first carrier surface and a second carrier surface, a scrim, a thermoplastic coating, and a mineral coating. The thermoplastic coating is positioned between the scrim and the first carrier surface and adheres the scrim to the first carrier surface. The mineral coating is adhered to the second carrier surface. The scrim of the coated reinforced composite facer is attached to at least one of the first insulation surface or the second insulation surface.

In accordance with one aspect of the present disclosure, a method of making a coated reinforced composite facer is provided. The method includes the steps of: a) directing a carrier substrate having a first carrier surface and a second carrier surface, a scrim, and a molten thermoplastic coating into a laminating device such that the molten thermoplastic coating is positioned between the scrim and the first carrier surface; b) laminating together the scrim, the molten thermoplastic coating, and the carrier substrate; and c) applying a mineral coating onto the second carrier surface to form the coated reinforced composite facer.

Other aspects, advantages, and features of the general inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
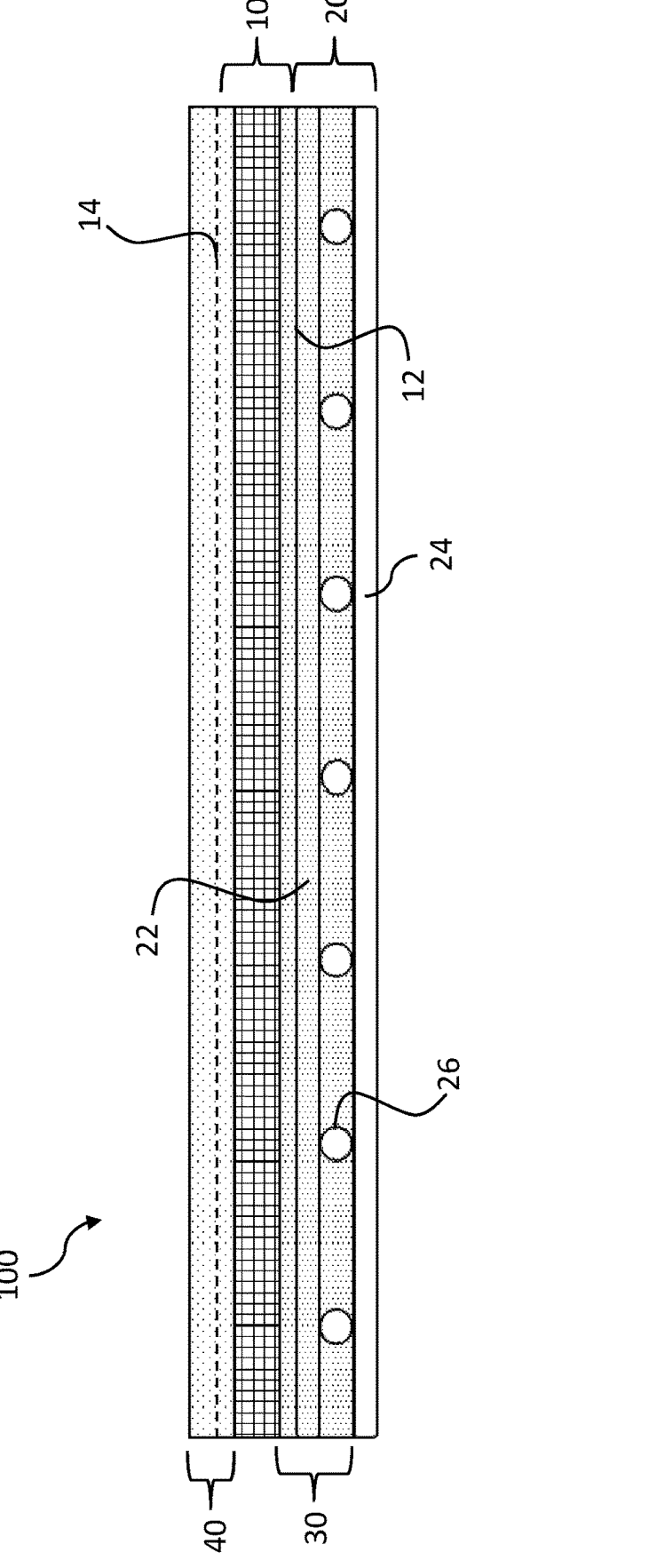
FIG. 1 is a cross-sectional view of an embodiment of a coated reinforced composite facer of the present disclosure.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts relate to a coated reinforced composite facer, a method of making the coated reinforced composite facer, and an insulation assembly that includes the coated reinforced composite facer. The coated reinforced composite facer of the present disclosure generally includes a thermoplastic coating that is positioned between a scrim and a carrier substrate and that adheres the scrim to the carrier substrate and a mineral coating on a surface of the carrier substrate opposite the thermoplastic coating and scrim. The scrim provides structural reinforcement to the facer as well as distributes surface loads exerted on the facer. Insulation assemblies, such as insulation panels and coverboards utilized in commercial roofing systems, that include the coated reinforced composite facer of the present disclosure exhibit improved fastener pull-through strength as a result of the surface load distribution provided by the coated reinforced composite facer. As a result of the improved fastener pull-through strength, the insulation assemblies of the present disclosure can be installed using fewer fasteners (as compared to a conventional coated glass facer) while still meeting desired wind uplift performance. In addition, the method of making the coated reinforced composite facer of the present disclosure includes a combined coating/lamination step that adheres or otherwise joins the scrim to the carrier substrate via the thermoplastic coating, followed by a coating step wherein a mineral coating is applied onto a surface of the carrier substrate opposite the thermoplastic coating and scrim, thereby forming the coated reinforced composite facer.

Referring now to FIG. 1, a coated reinforced composite facer 100 of the present disclosure is shown. The facer 100 comprises a carrier substrate 10 having a first carrier surface 12 and a second carrier surface 14. The facer 100 also comprises a scrim 20. A thermoplastic coating 30 is positioned between the scrim 20 and the first carrier surface 12 of the carrier substrate 10 and adheres the scrim 20 to the carrier substrate 10. In addition, the facer 100 comprises a mineral coating 40 adhered to the second carrier surface 14 of the carrier substrate 10.

The carrier substrate 10 can be structured in a variety of ways and can be formed of a variety of materials. Examples of substrates suitable for use as the carrier substrate 10 of the present disclosure include, but are not limited to, a glass mat, a coated glass mat, an impregnated glass mat, a paper (e.g., Kraft paper), and a metal foil (e.g., an aluminum foil). The glass mats, coated glass mats, and impregnated glass mats can be nonwoven or woven. In instances where the carrier substrate 10 is a coated glass mat or an impregnated glass mat, the mineral coating 40 is pre-applied to the carrier substrate 10.

In certain aspects, the carrier substrate 10 of the present disclosure comprises a nonwoven glass mat. The nonwoven glass mat generally includes a plurality of glass fibers and a binder composition that binds the glass fibers together. The glass fibers can be made from any type of glass. Exemplary glass fibers include, but are not limited to, A-type glass fibers, C-type glass fibers, E-type glass fibers, S-type glass fibers, ECR-type glass fibers (e.g., Advantex® glass fibers commercially available from Owens Corning of Toledo, Ohio), HiPer-tex® glass fibers (commercially available from 3B—The Fibreglass Company of Belgium), wool glass fibers, and combinations thereof.

The glass fibers used to form the nonwoven glass mat may have a variety of fiber diameters. In certain aspects, the glass fibers used to form the nonwoven glass mat have an average fiber diameter of 6.5 microns to 20 microns. In certain aspects, the glass fibers used to form the nonwoven glass mat have an average fiber diameter of 10 microns to 18 microns. In certain aspects, the glass fibers used to form the nonwoven glass mat have an average fiber diameter of 13 microns to 16 microns. It is also contemplated that a blend of glass fibers having different fiber diameters, such as a blend of smaller diameter glass fibers (e.g., average fiber diameter of 6.5 microns to 11 microns) and larger diameter glass fibers (e.g., average fiber diameter of 13 microns to 16 microns), may be used to form the nonwoven glass mat. In certain aspects, the nonwoven glass mat comprises a blend of 65% by weight to 75% by weight, based on the total weight of glass fibers, of 13 micron diameter glass fibers and 25% by weight to 35% by weight, based on the total weight of glass fibers, of 11 micron diameter glass fibers.

The glass fibers used to form the nonwoven glass mat may also have a variety of fiber lengths. In certain aspects, the glass fibers used to form the nonwoven glass mat have an average fiber length of 6.35 mm to 50.8 mm. In certain aspects, the glass fibers used to form the nonwoven glass mat have an average fiber length of 12.7 mm to 38.1 mm. In certain aspects, the glass fibers used to form the nonwoven glass mat have an average fiber length of 19.05 mm to 25.4 mm. In certain aspects, the glass fibers used to form the nonwoven glass mat have an average fiber length of 15.24 mm to 22.86 mm. It is also contemplated that a blend of glass fibers having different fiber lengths, such as a blend of shorter glass fibers (e.g., average fiber length of 6.35 mm to 12.7 mm) and longer glass fibers (e.g., average fiber length of 15.24 mm to 31.75 mm), may be used to form the nonwoven glass mat.

As mentioned above, the nonwoven glass mat also includes a binder composition to bind the glass fibers together. Any conventional binder composition may be used to form the nonwoven glass mat. In certain aspects, the binder composition comprises a thermoset binder resin. The thermoset binder resin may comprise, for example, an acrylic material, a urea formaldehyde material, or a combination thereof. In certain aspects, the binder composition comprises from 85% by weight to 95% by weight urea formaldehyde material and from 5% by weight to 15% by weight acrylic material.

In certain aspects, the nonwoven glass mat comprises from 5% by weight to 35% by weight binder composition, based on the total weight of the nonwoven glass mat. In certain aspects, the nonwoven glass mat comprises from 10% by weight to 30% by weight binder composition, including from 15% to 30% by weight binder composition, and also including from 22% to 27% by weight binder composition, based on the total weight of the nonwoven glass mat. As one of skill in the art will appreciate, the amount of binder composition used to form the nonwoven glass mat may be determined by loss on ignition (LOI).

The carrier substrate 10 of the present disclosure may have a wide range of basis weights. In certain aspects, the carrier substrate 10 has a basis weight of 25 g/m² to 150 g/m². In certain aspects, the carrier substrate 10 has a basis weight of 40 g/m² to 125 g/m². In certain aspects, the carrier substrate 10 of the present disclosure has a basis weight of 50 g/m² to 100 g/m², including a basis weight of 60 g/m² to 90 g/m², and also including a basis weight of 65 g/m² to 80 g/m².

The carrier substrate 10 of the present disclosure may also have a variety of thicknesses. In certain aspects, the carrier substrate 10 has a thickness of 0.25 mm to 4 mm. In certain aspects, the carrier substrate 10 has a thickness of 0.25 mm to 3 mm. In certain aspects, the carrier substrate 10 has a thickness of 0.25 mm to 2 mm. In certain aspects, the carrier substrate 10 has a thickness of 0.25 mm to 1.25 mm. In certain aspects, the carrier substrate 10 has a thickness of 0.5 mm to 1 mm. In certain aspects, the carrier substrate 10 has a thickness of 0.6 mm to 0.8 mm. In certain aspects, the carrier substrate 10 has a thickness of 0.7 mm to 4 mm, including a thickness of 1 mm to 3 mm, a thickness of 1 mm to 2.25 mm, a thickness of 1.25 mm to 1.9 mm, and also including a thickness of 1.5 mm to 1.8 mm.

With continued reference to FIG. 1, the coated reinforced composite facer 100 of the present disclosure includes a scrim 20. The scrim 20 provides structural reinforcement to the facer 100 as well as distributes surface loads that may be exerted on the facer 100. The scrim 20 can be structured in a variety of ways and can be formed of a variety of materials. In general, the scrim 20 is an open mesh that includes yarns that extend in a machine direction (i.e., warp yarns) and yarns that extend in a cross-machine direction (i.e., weft yarns). Exemplary materials for forming the scrim 20 of the present disclosure include, but are not limited to, a fiberglass (e.g., fiberglass yarns or rovings), a polymer (e.g., yarns of polyester, yarns of aramid, yarns of polyolefin), or a combination thereof. In addition, the scrim 20 can be a laid scrim or a woven scrim. In a laid scrim, the yarns that form the laid scrim are bonded to one another using a chemical adhesive or binder, such as a polyvinyl alcohol. On the other hand, in a woven scrim, the yarns that form the woven scrim are woven or knitted together.

In certain aspects, the scrim 20 of the present disclosure comprises a laid scrim comprising fiberglass (e.g., fiberglass yarns or rovings). The fiberglass used to form the laid scrim can be formed of any of the previously mentioned glasses (e.g., A-glass, E-glass, S-glass, ECR-glass) and can have a linear density of 100 tex to 4,400 tex, including from 300 tex to 2,000 tex, and also including from 600 tex to 1,000 tex. The laid scrim may have a side-by-side construction, an over/under construction, or any other known laid scrim construction. In a side-by-side construction, as illustrated in FIG. 1, top warp yarns 22 and bottom warp yarns 24 lie next to each other and the weft yarns 26 are positioned between the top and bottom warp yarns 22, 24 and set at a 90° angle with respect to the top and bottom warp yarns 22, 24. In an over/under construction (not shown), the top warp yarns and the bottom warp yarns are superposed and the weft yarns are positioned between the top and bottom warp yarns and set at a 90° angle with respect to the top and bottom warp yarns. In certain aspects, the laid scrim has a tensile strength of 1,000 N/50 mm to 1,500 N/50 mm in the machine direction and a tensile strength of 1,000 N/50 mm to 1,500 N/50 mm in the cross-machine direction. In certain aspects, the laid scrim has a tensile strength of 1,100 N/50 mm to 1,300 N/50 mm in the machine direction and a tensile strength of 1,100 N/50 mm to 1,300 N/50 mm in the cross-machine direction. In certain aspects, a tensile strength of the laid scrim in the machine direction is equal to a tensile strength of the laid scrim in the cross-machine direction.

The scrim 20 of the present disclosure can be constructed with a desired mesh density. The phrase "mesh density," as used herein, refers to the number of yarns per centimeter in both the machine direction (warp) and the cross-machine direction (weft). An example of the mesh density for the scrim 20 is 1.5×1.5, which means that the scrim 20 includes 1.5 warp yarns per centimeter of the scrim 20 and 1.5 weft yarns per centimeter of the scrim 20. A scrim 20 having a low mesh density will have a more open mesh configuration, whereas a scrim 20 having a high mesh density will have a more closed mesh configuration. In certain aspects, the scrim 20 has a mesh density of 0.4×0.4 to 4×4. In certain aspects, the scrim 20 has a mesh density of 0.5×0.5 to 2×2, including a mesh density of 1.25×1.25 to 1.75×1.75. In certain aspects, the scrim 20 has a mesh density where the number of warp yarns is different than the number of weft yarns. For example, the scrim 20 can be constructed to have a mesh density of 1×1.5, which means that the scrim 20 comprises 1 warp yarn per centimeter of the scrim 20 and 1.5 weft yarns per centimeter of the scrim 20.

The scrim 20 of the present disclosure may have a wide range of basis weights. In certain aspects, the scrim 20 has a basis weight of 50 g/m² to 200 g/m². In certain aspects, the scrim 20 has a basis weight of 70 g/m² to 175 g/m². In certain aspects, the scrim 20 of the present disclosure has a basis weight of 75 g/m² to 150 g/m², including a basis weight of 80 g/m² to 125 g/m², and also including a basis weight of 90 g/m² to 100 g/m².

The scrim 20 of the present disclosure may also have a variety of thicknesses. In certain aspects, the scrim 20 has a thickness of 0.2 mm to 4 mm. In certain aspects, the scrim 20 has a thickness of 0.25 mm to 3 mm. In certain aspects, the scrim 20 has a thickness of 0.25 mm to 2 mm. In certain aspects, the scrim 20 has a thickness of 0.25 mm to 1 mm. In certain aspects, the scrim 20 has a thickness of 0.25 mm to 0.75 mm. In certain aspects, the scrim 20 has a thickness of 0.3 mm to 0.6 mm. In certain aspects, the scrim 20 has a thickness of 0.3 mm to 4 mm, including a thickness of 0.4 mm to 3 mm, a thickness of 0.5 mm to 2 mm, a thickness of 0.75 mm to 2 mm, a thickness of 1 mm to 2 mm, and also including a thickness of 1.25 mm to 1.75 mm.

Still referring to FIG. 1, the coated reinforced composite facer 100 of the present disclosure includes a thermoplastic coating 30. The thermoplastic coating 30 is positioned between the scrim 20 and the first carrier surface 12 of the carrier substrate 10 and adheres the scrim 20 to the carrier substrate 10. The thermoplastic coating 30 can be applied between the scrim 20 and the first carrier surface 12 of the carrier substrate 10 using an extrusion coating process, as described in further detail below.

As seen in FIG. 1, the thermoplastic coating 30 can extend partially into the carrier substrate 10 (i.e., partially through a thickness of the carrier substrate 10 measured from the first carrier surface 12 to the second carrier surface 14), particularly when the carrier substrate 10 includes pores or voids therethrough (e.g., nonwoven glass mat, paper). Also, the thermoplastic coating 30 can encompass or envelope at least a portion of the scrim 20 (e.g., top warp yarns, bottom warp yarns, weft yarns). The thermoplastic coating 30 bonds to the carrier substrate 10 and to the scrim 20 as a result of being applied between the scrim 20 and the carrier substrate 10 in a molten, flowable form and subsequently solidifying. Thus, the thermoplastic coating 30 adheres the scrim 20 to the carrier substrate 10. In certain aspects, the thermoplastic coating 30 extends into the carrier substrate 10 in an amount of up to 75% of the thickness of the carrier substrate 10 (measured from the first carrier surface 12 to the second carrier surface 14). In certain aspects, the thermoplastic coating 30 extends into the carrier substrate 10 in an amount of up to 50% of the thickness of the carrier substrate 10. In certain embodiments, the thermoplastic coating 30 extends into the carrier substrate 10 in an amount of 1% to 50% of the thickness of the carrier substrate 10, including from 1% to 25% of the thickness of the carrier substrate 10, and also including from 5% to 20% of the thickness of the carrier substrate 10. In certain aspects, the second carrier surface 14 of the carrier substrate 10 is free of the thermoplastic coating 30. It should be appreciated that the thickness to which the thermoplastic coating 30 extends into the carrier substrate 10 may vary somewhat along a width and/or a length of the carrier substrate 10.

The thermoplastic coating 30 of the present disclosure can be formed of a variety of thermoplastic materials. Exemplary thermoplastic materials suitable for use in forming the thermoplastic coating 30 include, but are not limited to, a polyolefin (e.g., polypropylene, polyethylene), a polyacrylate, a polyester (e.g., polyethylene terephthalate), a polyamide, a polyimide, a polycarbonate, a polyurethane, a fluoropolymer, a copolymer of an olefin and an α,β-unsaturated carbonyl (e.g., α,β-unsaturated carboxylic acid, α,β-unsaturated ester, α,β-unsaturated amide), a synthetic rubber, a thermoplastic elastomer, and combinations thereof. In certain aspects, the thermoplastic coating 30 comprises polypropylene, polyethylene, styrene block copolymer (e.g., styrene-butadiene-styrene, styrene-isoprene-styrene, styrene-ethylene/butylene-styrene, styrene-ethylene/propylene), ethylene-vinyl acetate copolymer, ethylene-acrylate copolymer, ethylene-methyl acrylate copolymer, ethylene-ethyl acrylate copolymer, ethylene-butyl acrylate copolymer, polyvinyl chloride, polycaprolactone, polyvinylidene fluoride, or combinations thereof. In certain aspects, the thermoplastic coating 30 comprises at least one of polypropylene or polyethylene. In certain aspects, the thermoplastic coating 30 comprises from 80% by weight to 99% by weight polypropylene and from 1% by weight to 20% by weight polyethylene. In certain aspects, the thermoplastic coating 30 comprises from 85% by weight to 95% by weight polypropylene and from 5% by weight to 15% by weight polyethylene. In certain aspects, the thermoplastic coating 30 comprises a polyamide. Suitable polyamides include, but are not limited to, poly (hexano-6-lactam) (Nylon 6) and poly (hexamethylene adipamide) (Nylon 66). In certain aspects, the thermoplastic coating 30 comprises polyethylene terephthalate.

In addition to the thermoplastic material, the thermoplastic coating 30 of the present disclosure can optionally include one or more additives. Exemplary additives include, but are not limited to, fire retardants, dyes, pigments, UV stabilizers, anti-static agents, fillers, and so forth. Such additives are well known by those of ordinary skill in the art. Generally, any such additives used in the thermoplastic coating 30 will typically represent less than 25% by weight of the thermoplastic coating 30. Accordingly, the thermoplastic material will typically represent at least 75% by weight of the thermoplastic coating 30, including 80% by weight of the thermoplastic coating 30, 90% by weight of the thermoplastic coating 30, 95% by weight of the thermoplastic coating 30, and also including 100% by weight of the thermoplastic coating 30. In certain aspects, the thermoplastic coating 30 of the present disclosure includes a fire retardant additive. Suitable fire retardant additives for use in the thermoplastic coating 30 of the present disclosure include, but are not limited to, metal oxides, expandable graphite, antimony oxides (e.g., $Sb_2O_3$, $Sb_2O_5$, $Sb_2O_4$), aluminum hydroxide, zinc oxide, magnesium oxide, molybdenum compounds (e.g., molybdenum trioxide, ammonium octamolybdate, zinc molybdate), aluminum trihydrate, magnesium hydroxide, phosphorus containing compounds (e.g., phosphoric acid, organic phosphate esters, phosphates, halogenated phosphorus compounds, and inorganic phosphorus containing salts), boron containing compounds (e.g., zinc borate, ammonium fluoroborate, sodium borate and boric acid, barium metaborate), and halogen containing compounds (e.g., tetrabromophthalic anhydride, decabromodiphenyl ethane, chlorendic acid derivatives, decabromodiphenyl ether, tetrabromobisphenol A).

The thermoplastic coating 30 of the present disclosure may have a wide range of basis weights. In certain aspects, the thermoplastic coating 30 has a basis weight of 10 $g/m^2$ to 60 $g/m^2$. In certain aspects, the thermoplastic coating 30 has a basis weight of 15 $g/m^2$ to 50 $g/m^2$. In certain aspects, the thermoplastic coating 30 has a basis weight of 20 $g/m^2$ to 45 $g/m^2$, including a basis weight of 20 $g/m^2$ to 40 $g/m^2$, and also including a basis weight of 25 $g/m^2$ to 35 $g/m^2$.

The thermoplastic coating 30 of the present disclosure may also have a variety of thicknesses. In certain aspects, the thermoplastic coating 30 (including any portion that extends into the carrier substrate 10) has a thickness of less than or equal to 75 microns. In certain aspects, the thermoplastic coating 30 (including any portion that extends into the carrier substrate 10) has a thickness of 5 microns to 75 microns, including a thickness of 10 microns to 70 microns, a thickness of 15 microns to 60 microns, a thickness of 15 microns to 50 microns, a thickness of 15 microns to 40 microns, a thickness of 15 microns to 30 microns, and also including a thickness of 15 micron to 25 microns. In certain aspects, the thermoplastic coating 30 (including any portion that extends into the carrier substrate 10) has a thickness of 25 microns to 75 microns, including a thickness of 30 microns to 75 microns, a thickness of 40 microns to 75 microns, a thickness of 50 microns to 75 microns, and also including a thickness of 60 microns to 75 microns.

With continued reference to FIG. 1, the coated reinforced composite facer 100 of the present disclosure includes a mineral coating 40. The mineral coating 40 is adhered to the second carrier surface 14 of the carrier substrate 10. In general, the mineral coating 40 is the outward facing or exposed surface of the coated reinforced composite facer 100, which provides the facer 100 with a customary look and feel. In addition, the mineral coating 40 provides the facer 100 with a level of fire resistance and also decreases the LOI of the facer 100 by increasing the amount of inorganic material present. The mineral coating 40 can be applied to the second carrier surface 14 of the carrier substrate 10 using a conventional coating process including, but not limited to, a knife coating process, a fountain coating process, or a curtain coating process.

The mineral coating 40 can extend partially into the carrier substrate 10 (i.e., partially through a thickness of the carrier substrate 10 measured from the second carrier surface 14 to the first carrier surface 12), particularly when the carrier substrate 10 includes pores or voids therethrough (e.g., nonwoven glass mat, paper). In certain aspects, the mineral coating 40 extends into the carrier substrate 10 in an amount of up to 75% of the thickness of the carrier substrate 10 (measured from the second carrier surface 14 to the first carrier surface 12). In certain aspects, the mineral coating 40 extends into the carrier substrate 10 in an amount of up to 50% of the thickness of the carrier substrate 10. In certain embodiments, the mineral coating 40 extends into the carrier substrate 10 in an amount of 1% to 50% of the thickness of the carrier substrate 10, including from 1% to 25% of the thickness of the carrier substrate 10, and also including from 5% to 20% of the thickness of the carrier substrate 10. It should be appreciated that the thickness to which the mineral coating 40 extends into the carrier substrate 10 may vary somewhat along a width and/or a length of the carrier substrate 10.

The mineral coating 40 can be formed of a variety of materials. In certain aspects, the mineral coating 40 comprises an inorganic filler material and a binder. Examples of suitable inorganic filler materials that may be used to form the mineral coating 40 include, but are not limited to, calcium carbonate, clays (e.g., kaolin clay), sand, mica, talc, gypsum, alumina trihydrate (ATH), antimony oxide, or combinations thereof. Examples of suitable binders that may be used to form the mineral coating 40 include, but are not limited to, acrylic-type polymers (e.g., polymers or copolymers containing units of acrylic acid, methacrylic acid, esters thereof, and derivatives thereof, such as a styrene-acrylic copolymer), styrene-butadiene rubber (SBR), styrene-butadiene-styrene (SBS), ethylene-vinyl chloride (EVCI), polyvinylidene chloride (PVDC), modified polyvinyl chloride (PVC), polyvinyl alcohol (PVOH), ethylene-vinyl acetate (EVA), polyvinyl acetate (PVA), or combinations thereof.

In certain aspects, the mineral coating 40 optionally comprises one or more additives. Examples of suitable additives that may be used in the mineral coating 40 include, but are not limited to, dispersants, pigments, rheology modifiers, antifoaming agents, or combinations thereof.

In certain aspects, the mineral coating 40 comprises, on a dry weight basis, 90% to 95% by weight of an inorganic filler material and 5% to 10% by weight of a binder. In certain aspects, the mineral coating 40 comprises, on a dry weight basis, 90% to 95% by weight of an inorganic filler material, 5% to 10% by weight of a binder, and 0% to 3% by weight of one or more additives.

The mineral coating 40 of the present disclosure may have a wide range of basis weights. In certain aspects, the mineral coating 40 has a basis weight of 100 g/m$^2$ to 400 g/m$^2$. In certain aspects, the mineral coating 40 has a basis weight of 100 g/m$^2$ to 300 g/m$^2$. In certain aspects, the mineral coating 40 has a basis weight of 100 g/m$^2$ to 200 g/m$^2$, including a basis weight of 100 g/m$^2$ to 175 g/m$^2$, a basis weight of 100 g/m$^2$ to 150 g/m$^2$, and also including a basis weight of 100 g/m$^2$ to 125 g/m$^2$.

In addition to adhering the scrim 20 to the first carrier surface 12 of the carrier substrate 10, the thermoplastic coating 30 functions to effectively close off or seal the first carrier surface 12 of the coated reinforced composite facer 100 of the present disclosure. The mineral coating 40 adhered to the second carrier surface 14 also provides some amount of closing off or sealing of the second carrier surface 14 of the coated reinforced composite facer 100. Thus, the coated reinforced composite facer 100 of the present disclosure includes at least one surface that is generally impervious to air, water, or other fluids (e.g., a foamable mixture), which can prevent or substantially reduce bleed-through of a fluid that is applied to either surface of the facer 100.

The impervious nature of the coated reinforced composite facer 100 of the present disclosure may be characterized by Gurley porosity. Gurley porosity is a measure of the resistance of a material to air permeability. It may be measured in accordance with TAPPI T-460 (Gurley method), or similar methods. This test measures the time required for 100 cubic centimeters of air to be pushed through an approximately 6.45 cm$^2$ circular area of sample under a pressure of approximately 1.22 kPa. The result is expressed in seconds and is frequently referred to as Gurley seconds. As the Gurley porosity increases, permeability decreases, and as Gurley porosity decreases, permeability increases. The coated reinforced composite facer 100 of the present disclosure generally has an average Gurley porosity of at least 2,000 seconds. In certain aspects, the coated reinforced composite facer 100 of the present disclosure has an average Gurley porosity of 2,000 seconds to 6,000 seconds, including an average Gurley porosity of 2,250 seconds to 5,000 seconds, an average Gurley porosity of 2,500 seconds to 4,000 seconds, and also including an average Gurley porosity of 2,750 seconds to 3,500 seconds.

A desired Gurley porosity of the coated reinforced composite facer 100 can be achieved by adjusting the parameters of the thermoplastic coating 30. As noted above, the thermoplastic coating 30 effectively closes off or seals the first carrier surface 12 of the facer 100 and the mineral coating 40 adhered to the second carrier surface 14 also provides some amount of closing off or sealing of the second carrier surface 14 of the facer 100. In conventional coated glass facers, a primary function of the mineral coating is to provide a required Gurley porosity. This is typically achieved by utilizing a filler material having an average particle size of 5 microns or less to achieve close packing of the filler material and, thus, seal or close off the substrate. Filler materials having such a particle size tend to be more expensive than filler materials having a larger particle size. In the facer 100 of the present disclosure, the ability to adjust the parameters of the thermoplastic coating 30 to achieve a desired Gurley porosity allows less mineral coating 40 and/or lower cost materials (e.g., filler materials having an average particle size of 20 microns or more) for the mineral coating 40 to be used since a primary function of the mineral coating 40 of the facer 100 of the present disclosure is to provide a customary look and feel.

The coated reinforced composite facer 100 of the present disclosure also exhibits excellent physical properties, including tear strength, tensile strength, and fastener pull-through strength. In certain aspects, the coated reinforced composite facer 100 has a tear strength of 400 gram-force to 800 gram-force, including a tear strength of 500 gram-force to 800 gram-force, a tear strength of 550 gram-force to 750 gram-force, a tear strength of 625 gram-force to 700 gram-force, and also including a tear strength of 650 gram-force to 676 gram-force.

In certain aspects, the coated reinforced composite facer 100 has a tensile strength of 4,000 pounds per square inch (psi) to 7,000 psi. The tensile strength of the coated reinforced composite facer 100 is measured in accordance with ASTM D882 utilizing a sample that is 11 inches long and 2 inches wide.

In certain aspects, a fastener pull-through strength of the coated reinforced composite facer 100 is from 350 lbf to 600 lbf, including a fastener pull-through strength of 400 lbf to 600 lbf, a fastener pull-through strength of 450 lbf to 550 lbf, and also including a fastener pull-through strength of 475 lbf to 525 lbf, when the scrim 20 of the coated reinforced composite facer is interfaced with a polyisocyanurate foam substrate. It is believed that the scrim 20 improves the fastener pull-through strength of the reinforced composite facer 100 by distributing the surface load exerted on the coated reinforced composite facer 100. The fastener pull-through strength values achieved by the coated reinforced composite facer 100 of the present disclosure makes it possible to achieve a desired wind uplift performance (e.g., FM 1-90) using less fasteners. For example, a reduction in the total number of fasteners required to effectively install a cover board including the facer 100 of at least 20%, at least 30%, at least 40%, or at least 50% can be achieved.

The coated reinforced composite facer 100 of the present disclosure may have a wide range of basis weights. In certain aspects, the coated reinforced composite facer 100 has a basis weight of 185 g/m$^2$ to 810 g/m$^2$. In certain aspects, the coated reinforced composite facer 100 has a basis weight of 225 g/m$^2$ to 750 g/m$^2$. In certain aspects, the coated reinforced composite facer 100 has a basis weight of 250 g/m$^2$ to 700 g/m$^2$, including a basis weight of 275 g/m$^2$ to 675 g/m$^2$, a basis weight of 300 g/m$^2$ to 650 g/m$^2$, a basis weight of 350 g/m$^2$ to 500 g/m$^2$, and also including a basis weight of 375 g/m$^2$ to 425 g/m$^2$.

The coated reinforced composite facer 100 of the present disclosure may also have a variety of thicknesses. In certain aspects, the coated reinforced composite facer 100 has a thickness of 0.5 mm to 6 mm. In certain aspects, the coated reinforced composited facer 100 has a thickness of 0.5 mm to 5 mm, including a thickness of 0.5 mm to 4 mm, a thickness of 0.5 mm to 3 mm, a thickness of 0.5 mm to 2 mm, a thickness of 0.75 mm to 1.75 mm, a thickness of 0.9 mm to 1.6 mm, and also including a thickness of 1.1 mm to 1.5 mm.

Figure 2:
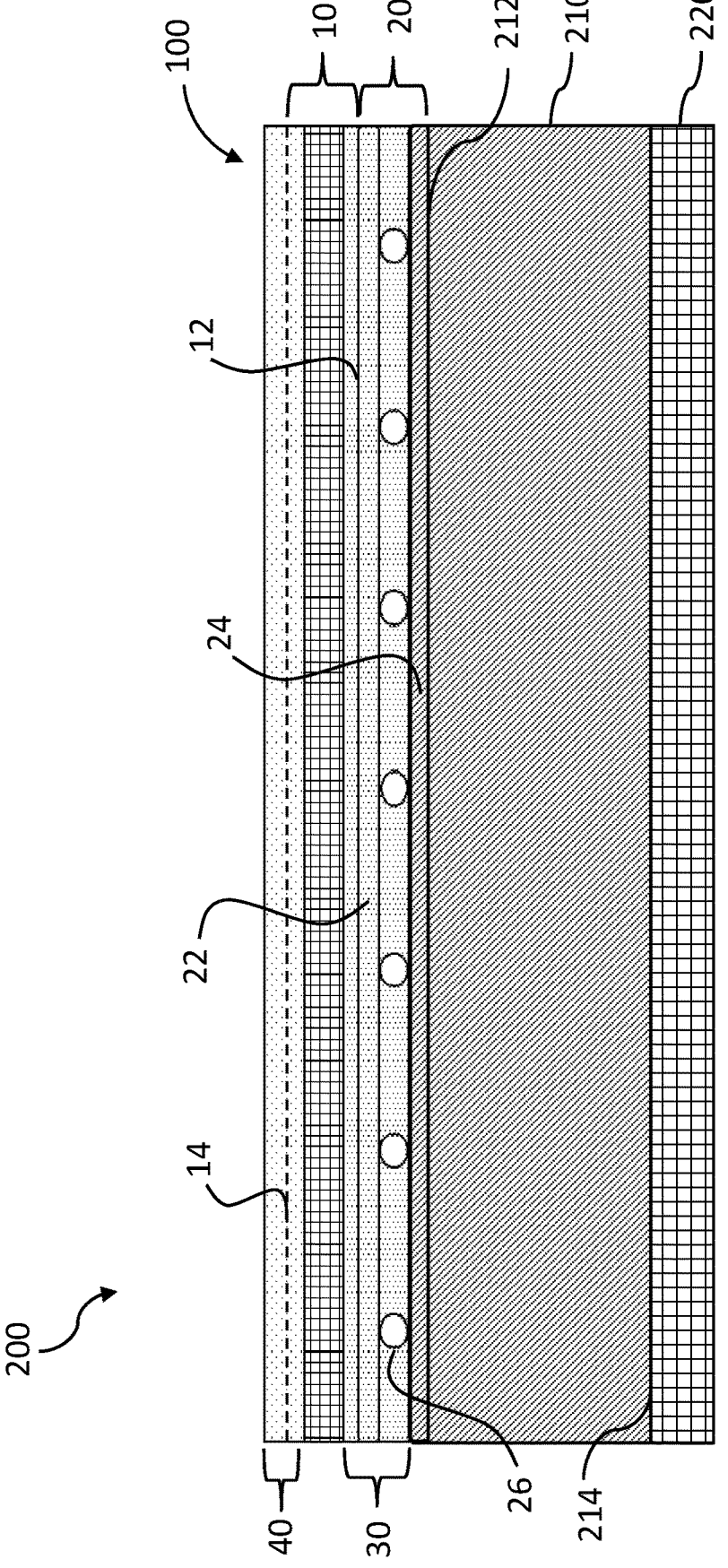
FIG. 2 is a cross-sectional view of an embodiment of an insulation assembly of the present disclosure.

Referring now to FIG. 2, an insulation assembly 200 of the present disclosure is shown. The insulation assembly 200 comprises an insulation substrate 210 having a first insulation surface 212 and a second insulation surface 214. The insulation assembly 200 also comprises a coated reinforced composite facer 100 of the present disclosure attached to the insulation substrate 210. The coated reinforced composite facer 100 used in the insulation assembly 200 may have any of the features or properties previously described herein. The same reference numerals used in FIG. 1 to describe the features and components of the coated reinforced composite facer 100 are also used in FIG. 2 and, thus, a detailed description thereof will not be repeated.

The scrim 20 of the coated reinforced composite facer 100 can be attached to the first insulation surface 212 or the second insulation surface 214. As seen in FIG. 2, the scrim 20 of the coated reinforced composite facer 100 is attached to the first insulation surface 212 of the insulation substrate 210 and a second facer 220 is attached to the second insulation surface 214 of the insulation substrate 210. The second facer 220 can comprise any suitable type of facer material including, but not limited to, a glass mat, a coated glass mat, an impregnated glass mat, a paper, a metal foil (e.g., an aluminum foil), or a coated reinforced composite facer 100 of the present disclosure.

The insulation substrate 210 can be formed of a variety of materials. In certain aspects, the insulation substrate 210 comprises at least one of a polyisocyanurate foam, a polyurethane foam, a polystyrene foam, a mineral wool, or a gypsum. The insulation substrate 210 can have a wide range of thicknesses. In certain aspects, the insulation substrate 210 has a thickness of 0.5 cm to 15.25 cm (as measured from the first insulation surface 212 to the second insulation surface 214), including a thickness of 0.762 cm to 15.25 cm, a thickness of 1.27 cm to 15.25 cm, a thickness of 2.54 cm to 15.25 cm, a thickness of 3.81 cm to 15.25 cm, a thickness of 5.08 cm to 15.25 cm, a thickness of 7.62 cm to 15.25 cm, a thickness of 10.16 cm to 15.25 cm, and also including a thickness of 12.7 cm to 15.25 cm. In certain aspects, the insulation substrate 210 has a thickness of 0.5 cm to 13.97 cm (as measured from the first insulation surface 212 to the second insulation surface 214), including a thickness of 0.5 cm to 15.25 cm, a thickness of 0.5 cm to 12.7 cm, a thickness of 0.5 cm to 11.43 cm, a thickness of 0.5 cm to 10.16 cm, a thickness of 0.5 cm to 8.89 cm, a thickness of 0.5 cm to 7.62 cm, a thickness of 0.75 cm to 6.35 cm, a thickness of 0.75 cm to 5.08 cm, a thickness of 0.75 cm to 3.81 cm, and also including a thickness of 1 cm to 2.54 cm.

In certain aspects, the insulation substrate 210 comprises a polyisocyanurate foam and has a thickness of 0.5 cm to 15.25 cm. In certain aspects, the insulation substrate 210 comprises a polyisocyanurate foam and has a thickness of 0.5 cm to 2.54 cm. In certain aspects, the insulation substrate 210 comprises a polyisocyanurate foam and has a thickness of 1.27 cm to 11.5 cm, including a thickness of 1.27 cm to 8.89 cm, a thickness of 1.27 cm to 7.62 cm, a thickness of 1.27 cm to 6.35 cm, a thickness of 1.27 cm to 5.08 cm, a thickness of 1.27 cm to 3.81 cm, and also including a thickness of 1.27 cm to 2.54 cm.

The insulation assembly 200 can be manufactured using conventional processes where a facer material is attached to an insulation substrate. For example, in a conventional process of forming a faced polyisocyanurate panel, the chemicals (e.g., an isocyanate, a polyol, and a blowing agent) are mixed at a mixing head and applied to a first facer material. At this point, the chemical reaction begins, and a second facer material is brought into contact with the foam mixture as it enters a laminator, which is used to control the thickness and other properties of the finished polyisocyanurate panel.

In the insulation assembly 200 of the present disclosure, the scrim 20 of the coated reinforced composite facer 100 is the portion of the facer 100 that initially engages or contacts the insulation substrate 210. The general structure of the scrim 20 promotes engagement or adhesion of the insulation substrate 210 with the facer 100. In certain aspects, when a foam material (e.g., polyisocyanurate) is used to form the insulation substrate 210, the foam material can adhere to or otherwise engage with the scrim 20. For example, the foam material can encompass or envelope at least a portion of the scrim 20 (e.g., portions of top warp yarns, portions of bottom warp yarns, portions of weft yarns). The engagement or adhesion between the insulation substrate 210 material and the scrim 20 of the facer 100 can further enhance the insulation assembly properties (e.g., fastener pull-through strength). The configuration of the facer 100 such that the scrim 20 of the facer 100 initially engages or contacts the insulation substrate 201 is particularly beneficial for attaching the facer 100 to the insulation substrate 210 when the insulation substrate 210 comprises a polyisocyanurate foam because polyisocyanurate foam generally does not adhere well to thermoplastic materials.

The insulation assembly 200 can be configured to have different lengths, widths, and heights (thicknesses) depending on a desired end use of the insulation assembly 200. In certain aspects, the insulation assembly 200 can have a length of 1.22 meters to 2.44 meters, a width of 0.61 meters to 1.524 meters, and a height of 1.27 cm to 12.7 cm. In certain aspects, the height of the insulation assembly 200 can vary along a length or a width of the insulation assembly 200, so as to provide an insulation assembly 200 having a slope.

In certain aspects, the insulation assembly 200 of the present disclosure can be used as an insulation panel, a cover board, or both an insulation panel and a cover board in a commercial or low-slope roofing system. In certain aspects, the insulation assembly 200 has a fastener pull-through strength of 350 lbf to 600 lbf, including a fastener pull-through strength of 400 lbf to 600 lbf, a fastener pull-through strength of 450 lbf to 550 lbf, and also including a fastener pull-through strength of 475 lbf to 525 lbf. In contrast, a conventional polyisocyanurate cover board that includes a coated glass facer generally has a fastener pull-through strength of 100 lbf to 160 lbf. The fastener pull-through strength of the insulation assembly 200 can be determined by modified ASTM D1761. The fastener pull-through strength of the insulation assembly 200 of the present disclosure permits the insulation assembly 200 to be installed with fewer fasteners as compared to an otherwise identical insulation assembly that includes a conventional coated glass facer instead of a coated reinforced composite facer 100 of the present disclosure. For example, a 1.22 meters×2.44 meters insulation assembly 200 of the present disclosure can be secured to a roof deck using eight (8) fasteners to achieve a wind uplift performance (e.g., FM 1-90), whereas an otherwise identical 1.22 meters×2.44 meters insulation assembly that includes a conventional coated glass facer instead of the coated reinforced composite facer 100 requires sixteen (16) fasteners for securing the insulation assembly to the roof deck to achieve the same wind uplift performance.

Thus, the insulation assembly 200 of the present disclosure when used as a component of a commercial or low-slope roofing system can reduce the total number of fasteners required to install the roofing system. As a result, less labor is required for roof installers to install the insulation assembly 200 and less materials (i.e., fasteners) are required to complete the installation. By reducing the labor time and the amount of required materials, the costs associated with installing the roofing system can also be reduced.

Figure 3:
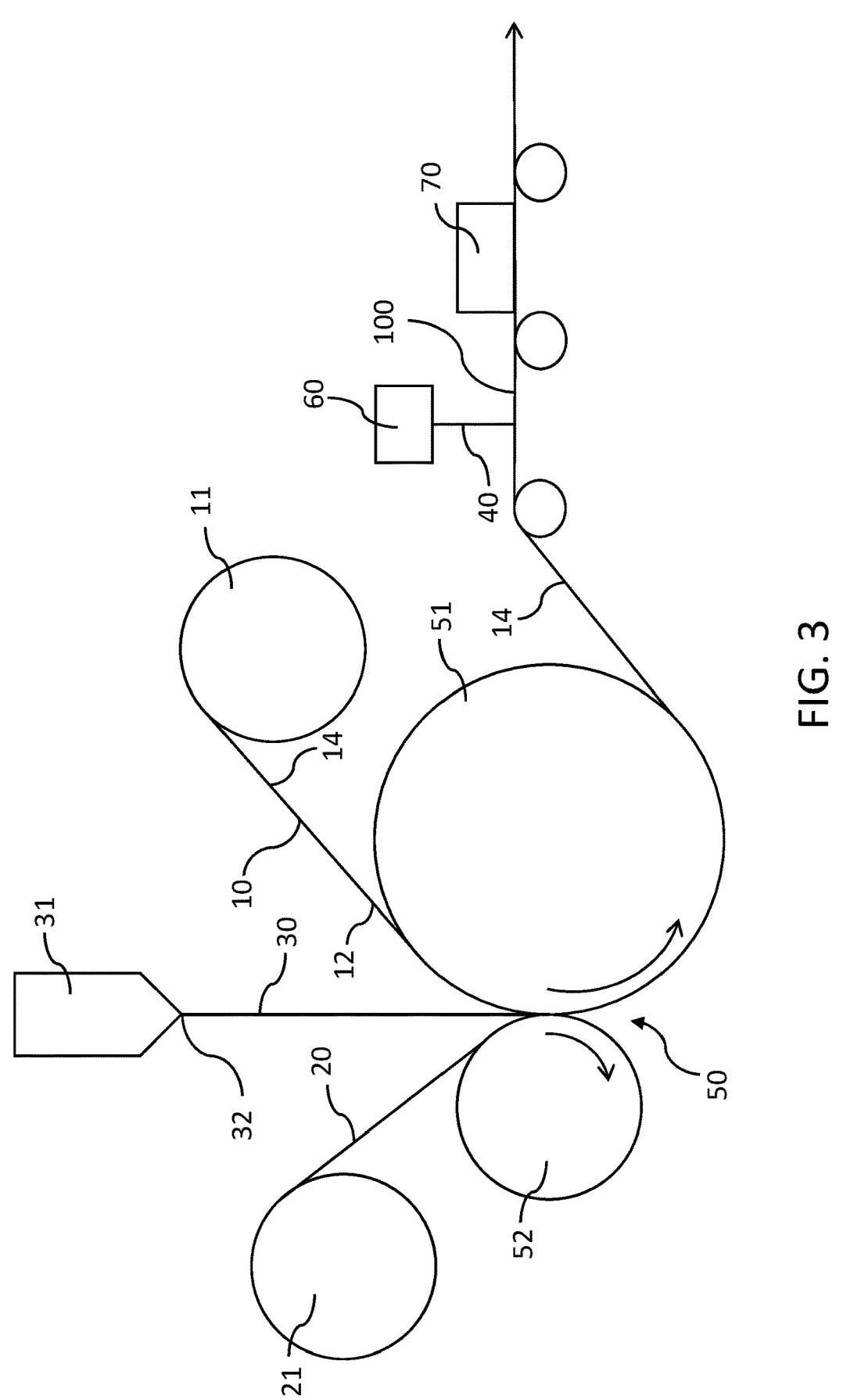
FIG. 3 is a schematic illustration of a method of making a coated reinforced composite facer of the present disclosure.

Referring now to FIG. 3, a method of making a coated reinforced composite facer 100 of the present disclosure is shown schematically. The same reference numerals used in FIG. 1 to describe the features and components of the coated reinforced composite facer 100 are also used in FIG. 3 and, thus, a detailed description thereof will not be repeated. As seen in FIG. 3, a carrier substrate 10 having a first carrier surface 12 and a second carrier surface 14 and a scrim 20 are unwound from respective supply rolls 11, 21 and directed into a laminating device 50. In addition, a molten thermoplastic coating 30 is directed into the laminating device 50 such that the molten thermoplastic coating 30 is positioned between the scrim 20 and the first carrier surface 12 of the carrier substrate 10. The scrim 20, the molten thermoplastic coating 30, and the carrier substrate 10 are laminated together in the laminating device 50. Next, a mineral coating 40 is applied to the second carrier surface 14 of the carrier substrate 10 to form the coated reinforced composite facer 100. The method of the present disclosure can be operated in a continuous manner.

In certain aspects, the molten thermoplastic coating 30 is formed by heating and mixing a thermoplastic material in an extruder 31 and extruding a molten thermoplastic from a die 32 (e.g., a slot die) to form the molten thermoplastic coating 30. In certain aspects, the laminating device 50 comprises a nip defined by a pair of counter-rotating rolls 51, 52. As seen in FIG. 3, the thermoplastic coating 30 in molten form is directed between the scrim 20 and the carrier substrate 10, and the scrim 20, the molten thermoplastic, and the carrier substrate 10 are pressed together by directing the materials through the nip defined by the pair of cooperating rolls 51, 52. In certain aspects of the method of the present disclosure, at least one of the rolls 51, 52 is chilled (e.g., water chilled, thermoelectric chilled) such that the molten thermoplastic cools and solidifies to form the thermoplastic coating that adheres the scrim 20 to the first carrier surface 12 of the carrier substrate 10.

As seen in FIG. 3, the laminated material continues moving through the process and encounters a coating station 60 that applies the mineral coating 40 onto the second carrier surface 14 to form the coated reinforced composite facer 100. The coating station 60 can be configured to perform any conventional coating process including, but not limited to, knife coating, fountain coating, or curtain coating.

In certain aspects, the coated reinforced composite facer 100 can be conveyed through an oven or dryer 70 to dry or cure the mineral coating 40. The finished coated reinforced composite facer 100 can be collected by winding the facer 100 onto a collection roll (not shown).

In certain aspects, the method of making a coated reinforced composite facer 100 can utilize a carrier substrate 10 in the form of a coated glass mat. In other words, the carrier substrate 10 used in the method can have a mineral coating 40 pre-applied to the second carrier surface 14. The method using a coated glass mat as the carrier substrate 10 can proceed in the same manner as described above with respect to FIG. 3 but does not require a step of applying the mineral coating 40.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The coated reinforced composite facers of the present disclosure can comprise, consist of, or consist essentially of the essential elements and limitations of the disclosure as described herein, as well as any additional or optional components or limitations described herein or otherwise useful in facer applications.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

What is claimed is:

1. A coated reinforced composite facer comprising:
   a) a carrier substrate having a first carrier surface and a second carrier surface;
   b) a scrim;
   c) a thermoplastic coating positioned between the scrim and the first carrier surface, wherein the thermoplastic coating adheres the scrim to the first carrier surface and comprises at least one of a polyolefin, a polyester, a polyamide, a polyimide, a polycarbonate, a polyurethane, or a fluoropolymer; and
   d) a mineral coating adhered to the second carrier surface.

2. The coated reinforced composite facer according to claim 1, wherein a total basis weight of the coated reinforced composite facer is from 185 g/m$^2$ to 810 g/m$^2$.

3. The coated reinforced composite facer according to claim 1, wherein the carrier substrate comprises at least one of a glass mat, a coated glass mat, an impregnated glass mat, a paper, or a metal foil, and
   wherein the carrier substrate has a basis weight of 25 g/m$^2$ to 150 g/m$^2$.

4. The coated reinforced composite facer according to claim 1, wherein the scrim comprises at least one of a fiberglass or a polymer,
   wherein the scrim is a laid scrim or a woven scrim, and wherein the scrim has a basis weight of 50 g/m$^2$ to 200 g/m$^2$.

5. The coated reinforced composite facer according to claim 1,
   wherein the thermoplastic coating has a basis weight of 10 g/m$^2$ to 60 g/m$^2$.

6. The coated reinforced composite facer according to claim 5, wherein the thermoplastic coating further comprises an additive comprising at least one of a fire retardant, a dye, a pigment, a UV stabilizer, an anti-static agent, or a filler.

7. The coated reinforced composite facer according to claim 1, wherein the mineral coating comprises an inorganic filler material and a binder, and
   wherein the mineral coating has a basis weight of 100 g/m$^2$ to 400 g/m$^2$.

8. The coated reinforced composite facer according to claim 1, wherein the coated reinforced composite facer has an average Gurley porosity of at least 2,000 seconds.

9. The coated reinforced composite facer according to claim 1, wherein a pull-through strength of the coated reinforced composite facer is from 350 lbf to 600 lbf when the scrim of the coated reinforced composite facer is interfaced with a polyisocyanurate foam substrate.

10. An insulation assembly comprising:
   a) an insulation substrate having a first insulation surface and a second insulation surface; and
   b) a coated reinforced composite facer, wherein the coated reinforced composite facer comprises:
      i) a carrier substrate having a first carrier surface and a second carrier surface;
      ii) a scrim;

iii) a thermoplastic coating positioned between the scrim and the first carrier surface, wherein the thermoplastic coating adheres the scrim to the first carrier surface and comprises at least one of a polyolefin, a polyester, a polyamide, a polyimide, a polycarbonate, a polyurethane, or a fluoropolymer; and
      iv) a mineral coating adhered to the second carrier surface,
   wherein the scrim is attached to the first insulation surface or the second insulation surface.

11. The insulation assembly according to claim 10, wherein the insulation substrate comprises at least one of a polyisocyanurate foam, a polyurethane foam, a polystyrene foam, or a mineral wool, and
   wherein the insulation substrate has a thickness of 0.5 cm to 12.7 cm.

12. The insulation assembly according to claim 10, wherein a total basis weight of the coated reinforced composite facer is from 185 g/m$^2$ to 810 g/m$^2$.

13. The insulation assembly according to claim 10, wherein the carrier substrate comprises at least one of a glass mat, a coated glass mat, an impregnated glass mat, a paper, or a metal foil, and
   wherein the carrier substrate has a basis weight of 25 g/m$^2$ to 150 g/m$^2$.

14. The insulation assembly according to claim 10, wherein the scrim comprises at least one of a fiberglass or a polymer,
   wherein the scrim is a laid scrim or a woven scrim, and wherein the scrim has a basis weight of 50 g/m$^2$ to 200 g/m$^2$.

15. The insulation assembly according to claim 10, wherein the thermoplastic coating has a basis weight of 10 g/m$^2$ to 60 g/m$^2$.

16. The insulation assembly according to claim 15, wherein the thermoplastic coating further comprises an additive comprising at least one of a fire retardant, a dye, a pigment, a UV stabilizer, an anti-static agent, or a filler.

17. The insulation assembly according to claim 10, wherein the mineral coating comprises an inorganic filler material and a binder, and
   wherein the mineral coating has a basis weight of 100 g/m$^2$ to 400 g/m$^2$.

18. The insulation assembly according to claim 10, wherein the coated reinforced composite facer has an average Gurley porosity of at least 2,000 seconds.

19. The insulation assembly according to claim 10, wherein a pull-through strength of the insulation assembly is from 350 lbf to 600 lbf.

20. A method of making a coated reinforced composite facer, the method comprising:
   a) directing a carrier substrate having a first carrier surface and a second carrier surface, a scrim, and a molten thermoplastic coating comprising at least one of a polyolefin, a polyester, a polyamide, a polyimide, a polycarbonate, a polyurethane, or a fluoropolymer into a laminating device such that the molten thermoplastic coating is positioned between the scrim and the first carrier surface;
   b) laminating together the scrim, the molten thermoplastic, and the carrier substrate; and
   c) applying a mineral coating onto the second carrier surface, thereby forming the coated reinforced composite facer.

* * * * *